United States Patent [19]
Gooch et al.

[11] Patent Number: 5,729,413
[45] Date of Patent: Mar. 17, 1998

[54] TWO-GAP MAGNETIC READ/WRITE HEAD

[75] Inventors: Beverley R. Gooch, Sunnyvale; George Varian, Palo Alto, both of Calif.

[73] Assignee: Ampex Corporation, Redwood City, Calif.

[21] Appl. No.: 575,563

[22] Filed: Dec. 20, 1995

[51] Int. Cl.⁶ .................. G11B 5/23; G11B 5/265
[52] U.S. Cl. .................. 360/125; 360/119; 360/121
[58] Field of Search .................. 360/103, 110, 360/115, 119, 121, 123–126

[56] References Cited

U.S. PATENT DOCUMENTS

| | | | |
|---|---|---|---|
| 3,127,592 | 3/1964 | Neergaard | 360/112 |
| 3,239,823 | 3/1966 | Chang | 360/111 |
| 3,432,837 | 3/1969 | Fan | 360/119 |
| 4,758,917 | 7/1988 | Gooch | 360/121 |
| 4,787,002 | 11/1988 | Isozaki | 360/118 |
| 4,954,921 | 9/1990 | Bolt | 360/121 |
| 4,985,795 | 1/1991 | Gooch | 360/115 |
| 5,119,255 | 6/1992 | Gooch | 360/115 |
| 5,123,156 | 6/1992 | Meunier et al. | 360/121 |
| 5,130,876 | 7/1992 | Gooch | 360/115 |
| 5,153,796 | 10/1992 | Gooch | 360/115 |
| 5,189,572 | 2/1993 | Gooch | 360/77 |
| 5,227,939 | 7/1993 | Gooch | 360/115 |
| 5,345,354 | 9/1994 | Ito et al. | 360/121 |
| 5,450,264 | 9/1995 | Nishimura et al. | 360/121 |

FOREIGN PATENT DOCUMENTS

| | | | |
|---|---|---|---|
| 0110513 | 6/1984 | European Pat. Off. | 360/121 |
| 56-29830 | 3/1981 | Japan | 360/121 |
| 63-308715 | 12/1988 | Japan | 360/121 |
| 93/12928 | 7/1993 | WIPO . | |

Primary Examiner—Jefferson Evans
Attorney, Agent, or Firm—James M. Thomson; John G. Mesaros

[57] ABSTRACT

An improved magnetic head obviates the need for separate read and write heads in a magnetic storage system by providing a head core having two physical gaps configured to generate a reproduce track width that is narrower than a record track width. The core of the head comprises a tapered center pole disposed between two generally symmetrical main poles to form physical record and reproduce gaps. A magnetically saturable, high permeability element is disposed within the core in a manner that bridges the rear of the record gap.

4 Claims, 6 Drawing Sheets

TWO-GAP MAGNETIC READ/WRITE HEAD

FIELD OF THE INVENTION

This invention relates generally to magnetic storage systems and, more particularly, to an improved magnetic read/write head susceptible of use in such systems.

DESCRIPTION OF THE PRIOR ART

In a conventional high-density, magnetic storage system employing a magnetic storage medium, such as a magnetic layer on a disk, the same magnetic transducer is typically used for both read (reproduce) and write (record) operations. During these operations, magnetic flux transferred to and from the storage medium permeates a magnetic core of the transducer. Generally, the magnetic core of the transducer includes a plurality of poles separated by a physical gap.

Specifically, during record operations, a permeating flux is provided that results from current applied to a coil winding associated with the head, and fringes outwardly from the gap for recording of a representative signal on the medium. During reproduce operations, on the other hand, the flux from the previously recorded magnetic storage bits produce an induced output voltage in the winding which, after suitable amplification, is a representation of the magnetic signal flux that previously permeated the core. Thus, the flux from the recorded bits in the storage medium is induced directly into the head through the physical gap in the head core. Significantly, the record track width and the reproduce track width of the head are dependent upon, inter alia, the physical gap as defined by the head poles.

In the case of a conventional read/write ring head, the same physical gap is typically used for both record and reproduce operations. Since the track width is determined by the same head gap, the reproduce head must be perfectly aligned to avoid reading unrecorded media. Consequently, a problem often arises with such tracks involving misregistration of the head positioning servomechanism of the magnetic storage system.

For example, slight errors in the servomechanism may result in misalignment when positioning the head over a recorded track. Thereafter when new information is recorded on the track, the previously stored signals may not be completely obliterated, thus leaving behind residual signals along the edge of the track. During subsequent reproduction operations with respect to this over-recorded track, the head may detect these residual signals along with the newly recorded signals. The ratio between such residual recorded signal, and the new recorded signal is a major factor in establishing the signal-to-noise level that ultimately limits data detection and storage capacity of the system.

Head assemblies using magnetoresistive (MR) head elements are strictly reproduce devices and do not record. Therefore such head assemblies typically include a separate MR element for read operations and a ring-type head for write operations. These head assemblies are further aligned in tandem and configured such that the record track width of the write head; i.e. a conveying head, is made wider than the reproduce track width of the MR read head. This, in turn, increases the tracking tolerance (i.e., the tracking tolerance is effectively equal to half the difference between the record and reproduce track widths) of the head assembly.

However, a magnetic storage system employing a rotary actuator generally "sweeps-out" an arcuate path across the medium when locating a targeted track. The arcuate path of travel forces the leading head of the assembly to follow a slightly larger radius of excursion than the trailing head, thereby leading to possible misregistration with the MR head when reproducing information stored on a recorded track. This problem becomes particulary acute when employing MR head assemblies with narrow track widths.

SUMMARY OF THE INVENTION

An improved magnetic head is described in accordance with the invention which obviates the need for separate read and write heads in a magnetic storage system by providing a head core having two physical gaps configured to generate a reproduce gap width that is narrower than the recorded track width. In accordance with the invention, the narrower reproduce gap is preferably centered within the record track for storing signals on a magnetic storage medium so as to negate or minimize retrieval of residual signals during reproduction operations.

Specifically, the core of the improved read/write head comprises a tapered center pole disposed between two generally symmetrical main poles to form physical record and reproduce gaps, respectively. Preferably, the wider side of the center pole defines the record gap and thus, the record track width. The narrower center pole side defines the reproduce track of the head well within the boundaries established by the wider side of the center pole. A winding window region of the core accomodates a coil winding that extends between and among the poles for conducting electric current to and from the head.

In the preferred embodiment, a magnetically saturable, high permeability element is disposed within the core in a manner that bridges the rear of the record gap. The saturable head element is preferably used in conjunction with a magnetic storage medium also having a continuous magnetically saturable, high permeability "keeper" member disposed in contiguous relation to a high coercivity magnetic layer in which magnetic signals are stored. In the illustrative embodiment described herein, the keeper member may be disposed either as an overlaying or as an underlying layer with respect to the magnetic storage medium. The keeper functions as a magnetic shunt to capture and maintain the magnetization of the signals stored in the magnetic storage layer by efficiently directing substantially the entire flux from those signals to adjacent magnetic signals.

In accordance with one aspect of the present invention, adjacent magnetic regions of different permeabilities may be selectively established along both the saturable head element and the keeper layer. Specifically, when a region of either element or layer is saturated, the permeability of that region is thereby lowered so that signal flux is not transmitted through that region. Instead, the signal flux is directed through unsaturated regions of the element or layer adjacent the saturated region so as to be linked with the poles of the magnetic head. These regions of different permeabilities enable the novel two-gap head architecture to function efficiently during record and reproduce operations with respect to the signals stored in and retrieved from the magnetic layer of the storage layer, as described in more detail hereinafter.

For example, if a current is applied to the coil winding during a record operation, it generates a recording field that saturates both a region of the keeper layer directly opposite the two physical gaps, that portion of the saturable element that bridges the record gap, thereby reducing the permeabilities of both these regions. This allows the recording field to fringe from both gaps into the magnetic storage layer. Ideally, the storage layer receives field fringing from the reproduce gap prior to the field emanating from the record gap. Irreversible magnetization occurs when the medium passes through a "record zone", i.e., the point at which the recording field equals the coercivity of the storage layer. The system is designed so that this phenomenon preferably occurs near the trailing edge of the record gap.

During a reproduce operation, a small bias current is applied to the coil winding to generate a bias flux in the head core. The bias field generated from this flux is substantially less than that occuring from the record field. Therefore, the bias flux is insufficient to achieve the flux density required to saturate the element bridging the record gap. The record gap is therefore shunted by the saturable element and no bias flux fringes from the record gap.

However, the field required to saturate the transducing zone of the keeper layer is equal to the bias field and a magnetic field generated by the underlying magnetization of the magnetic layer. Therefore, the generated bias field is preferably sufficient to selectively saturate the keeper layer over an area solely proximate the reproduce gap. The record gap is thus shunted by both the keeper layer and saturable element, thereby enabling the novel two-gap head to function as a conventional single-gap head in this mode.

An alternate embodiment of the invention establishes a similar relationship between the medium, head and saturable element according to the configuration described above, but with a different keeper means. In the alternate embodiment, the keeper member is deposited on the surfaces of the head poles. This head embodiment therefore can be used advantageously with conventional disk storage media, i.e., media without a keeper layer.

Advantages of the present invention include an improvement in the signal-to-noise ratio of the magnetic storage system, along with an increase in the data capacity of the system. Furthermore, since reproduce tracks are used having widths narrower than the record tracks, artificial guard-bands are created within the magnetic storage layer. These guard-bands obviate the need for conventional guard-banding and result in an increase in track density.

BRIEF DESCRIPTION OF THE DRAWINGS

The above and other features and advantages of the invention may be better understood by referring to the following description in conjunction with the accompanying drawings in which.

DETAILED DESCRIPTION OF ILLUSTRATIVE EMBODIMENT

Figure 1:
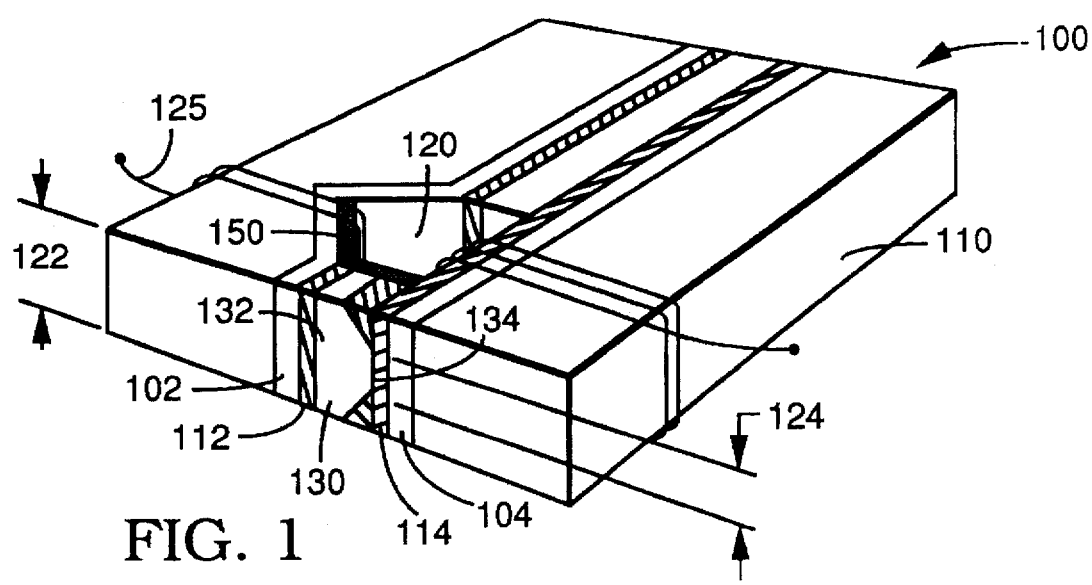
FIG. 1 is a perspective diagram of a two-gap magnetic fetid/write head designed according to the present invention.

Referring now to FIG. 1, a two-gap magnetic read/write head 100 is illustrated including a thin, tapered center pole 130 disposed between generally symmetrical first and second main poles 102, 104 of a core 110. Two non- magnetic gap elements 112, 114 separate the highly permeable center pole 130 from its adjacent main poles. As described herein, core 110 is preferably constructed of magnetic material suitable for magnetic transducers, such as ferrite, and main poles 102, 104 are preferably fabricated from an Fe-Al alloy (e.g., alfesil). Similarly, center pole 130 may be fabricated from either alfesil or a Ni-Fe alloy (e.g, permalloy), while non-magnetic material, e.g., glass or silicon dioxide, may be provided between the poles to obtain well-defined physical gap elements 112, 114.

An aperture 120 is provided extending through core 110. The aperture is arranged and dimensioned to impinge upon center pole 130 and main pole 102. The winding window created by aperture 120 allows gaps 112, 114 to accomodate a plurality of coiled electrical conductors forming coil 125, arranged between the, poles of the core as best seen in FIG. 5(f). Functionally, the coil winding 125 serves to conduct electric current within head 100.

Figure 2:
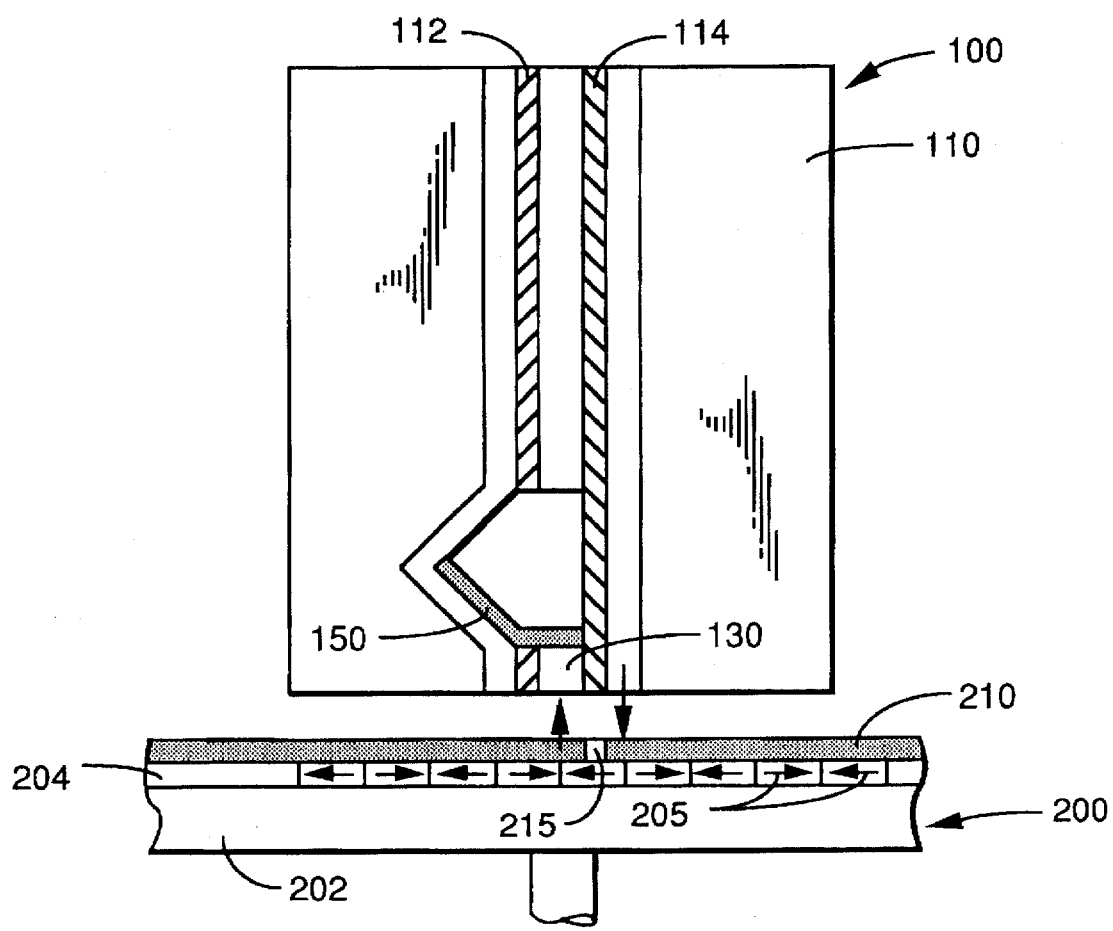
FIG. 2 is a schematized cross-section diagram of the two-gap magnetic read/write head of FIG. 1 in relation to a magnetic storage medium having a keeper member deposited as a layer on the medium.

The magnetic structure of core 110 defines a magnetic flux path for transferring magnetic signals to and from magnetic storage layer 204 as illustrated in FIG. 2. Coil winding 125, disposed about the core, is in magnetic coupling relation to that flux path for coupling the flux path with magnetic storage components (not shown) external to the head 100. To minimize core reluctance, the flux path length is preferably short and its cross-sectional area is large, compatible with provision of a required number of turns on winding 125.

In accordance with an aspect of the invention, a wider side 132 of center pole 130 defines record gap 112 and an accompanying record track width 122, while a narrower center pole side 134 defines reproduce gap 114. The narrower, tapered side 134 also functions to limit a reproduce track width 124 of head 100 within the boundaries established by the wider record track. It will be apparent to those skilled in the art that the lengths of the record and reproduce gaps may be adjusted independently to achieve optimum results for the functions of each gap.

Additionally, a magnetically saturable, high permeability element 150 is disposed within core 110 to bridge the rear of record gap 112. It should be noted that the thickness of element 150 is a determining factor in its performance. Thus, the thickness is selected relative to the potential flux needed therein to saturate a selected portion of the element. Preferably, the thickness of element 150 is sufficient that flux generated from bias current applied to the head is just insufficient to saturate that portion of element 150 that bridges the record gap.

In the illustrative embodiment described herein, saturable element 150 is used in conjunction with a magnetic storage layer having a magnetically saturable, low reluctance, high permeability keeper member disposed in proximate relation to the magnetic storage layer. FIG. 2 is a cross-sectional view of the head 100 illustrating saturable element 150 in opposed spaced relationship to a keeper member 210 adjacent to magnetic storage layer 204.

As shown in FIG. 2, the keeper member is deposited on the magnetic storage medium as a layer 210. However, in accordance with the present invention, the keeper may also be deposited on portions of the two-gap head 100 or on both the magnetic storage layer and portions of the head, as will be explained hereinafter.

As shown the magnetic storage medium 200 is preferably a laminated composite structure comprising a base substrate 202 and a high coercivity (hard) magnetic layer 204 disposed on the substrate for receiving and storing magnetic signals. The substrate 202 is preferably made of a non-magnetic material, such as aluminum, plastic or glass, while the hard magnetic layer 204 may comprise magnetic particles dispersed in a binder or a continuous film of high coercivity magnetic material, such as metal or metal alloy. It is contemplated that magnetic storage medium 200 be made using existing fabrication techniques that are well known in the magnetic storage art, and a detailed description off the fabrication method is therefore not provided.

Either digital or analog signals may be recorded in the magnetic medium in a variety of conventional manners known in the art. In the illustrative embodiment, digital signals are preferably recorded in the hard magnetic layer 204 in longitudinal fashion. In this regard, the recorded magnetic layer is depicted in FIG. 2 as having a plurality of individual regions 205 in which the magnetic signals or bits (depicted by solid arrows) are stored. The axes of magnetization of the regions 205 are oriented horizontally relative to the plane of the magnetic layer 204.

As noted, the keeper may be deposited on the storage medium 200 as a continuous, magnetically saturable layer 210 of high permeability, low coercivity (soft) magnetic material in which adjacent regions of different permeabilities are selectively established. The adjacent regions of different permeabilities are preferably provided by establishing adjacent magnetically saturated and unsaturated regions. Significantly, keeper layer 210 functions as a magnetic shunt to capture and maintain the magnetization of the signals stored on the magnetic layer of the medium by directing substantially the entire flux of those stored signals to adjacent magnetic signals. An example of a magnetic storage media arrangement suitable for use in accordance with the illustrative embodiment of the present invention is described in commonly-assigned U.S. Pat. No. 5,041,922, issued on Aug. 20, 1991 and titled, *Magnetic Recording Medium Having Magnetic Storage and Saturable Layers, and Apparatus and Method Using the Medium*, which patent is incorporated by reference as though fully set forth herein.

In the illustrative embodiment, keeper layer 210 is constructed from material, such as permalloy or alfesil, having a high absolute permeability and, as compared to the magnetic storage layer 204, low coercivity and low magnetic saturation density. The thickness of the keeper is selected so that it is not quite saturated by the media. Keeper layer 210 is an integral part of the laminated composite magnetic storage medium 200 and functions to provide a reluctance to flux along an internal path relative to the reluctance along a magnetic flux path that extends through the core 110 of the head 100 to assure that the desired transmission of information signals occurs between the magnetic layer 204 and the core 110. In addition, keeper layer 210 also serves to retain flux from signals recorded on magnetic layer 204, in absence of a bias flux that magnetically effects the formation therein of a transducing zone 215, as described hereinafter.

If desired, a non-magnetic layer (not shown) may be disposed on the hard magnetic layer of medium 200 to interrupt effects of magnetic exchange coupling between the keeper layer 210 and the magnetic layer 204, allowing these latter layers to react separately to the flux induced by the bias current in the head. The materials of the non-magnetic layer may include chromium, carbon or silicon. An example of a magnetic storage media arrangement disclosing such a non-magnetic layer is International Patent Application No. WO 93/12928, published Jul. 8, 1993 and titled, *Magnetic Recording Media Employing Soft Magnetic Material*, which application is incorporated by reference as though fully set forth herein.

Referring again to FIG. 2 a transducing zone 215 is formed in keeper layer 210 by creating in that layer one or more significant magnetic discontinuities, i.e., areas of substantially different permeability, such as typically are provided in magnetic heads by the inclusion of a physical transducing gap. In effect, the formation of a transducing zone 215 in the keeper layer functionally eliminates the physical spacing between the head 100 and magnetic layer 204, and allows magnetic coupling between magnetic elements of core 11 of the head and magnetic layer 204 to facilitate transfer of signals.

In accordance with another aspect of the present invention, adjacent regions of different permeabilities may be selectively established along both saturable element 150 and keeper layer 216. By saturating a region of each such element or layer, the permeability of that region is lowered and signal flux is not shunted through the region. Instead, the flux is directed through unsaturated regions of the element or layer adjacent the saturated region. These regions of different permeabilities enable the novel two-gap head architecture to function efficiently during record and reproduce operations with respect to the signals stored on and retrieved from the magnetic layer of the storage medium.

Figure 3:
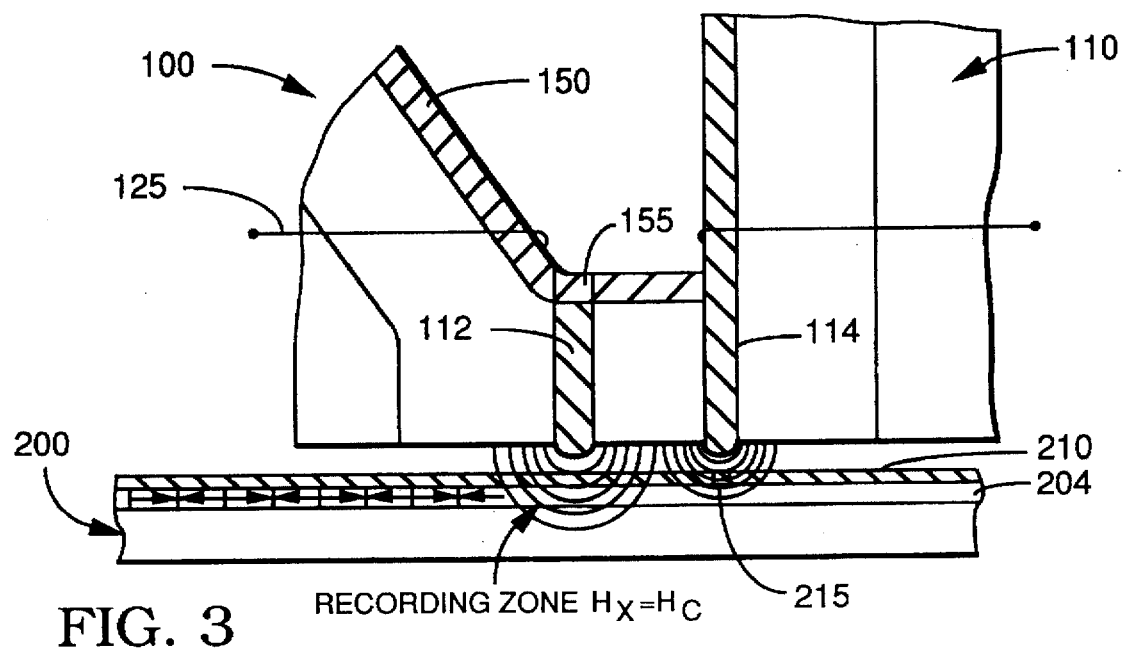
FIG. 3 is a schematized cross-section diagram depicting magnetic flux coupling between the two-gap magnetic read/write head and magnetic storage medium of FIG. 2.

FIG. 3 is a schematized diagram depicting magnetic flux coupled between the two-gap magnetic read/write head 100 and the magnetic storage medium 200. Initially, flux coupling is described with respect to the approximate magnetic fields generated when a current is applied to coil winding 125 during a record mode. During this mode of operation, a record current applied to the coil winding generates a recording field that saturates both a region of the keeper layer 210 directly opposite the two physical gaps 112, 114, and that portion 155 of the saturable element 150 that bridges the record gap 112, thereby reducing the permeabilities of these regions. This allows the recording field to fringe from both gaps into magnetic layer 204 of the storage medium 200.

In order to magnetize the magnetic layer, the last field that the medium is exposed to, i.e., the "recording field" (Hx), must reach a predetermined value approximating the medium coercivity (Hc), preferably at a distance from the last physical gap that is equal to the flying height plus the keeper layer and storage layer thicknesses. In other words, irreversible magnetization results when the medium passes through a "record zone", i.e., the region within a field contour line of the record fringing field Hx that equals the medium coercivity $H_c$.

The storage medium 200 initially encounters the field fringing from the reproduce gap 114. However irreversible magnetization does not occur in this region. The medium then passes by the record gap 112 where it encounters the last field to which it is exposed, i.e., the record field. It is at this point when the medium passes through the record zone of the record fringing field near the trailing edge of the record gap that irreversible magnetization takes place and recording occurs in the medium.

During a reproduce operation, a small bias current is applied to coil winding 125 to generate a bias flux in the head core 110. The bias field generated from this flux is substantially less than the record field and, according to the invention, insufficient to achieve the required flux density needed to saturate element 150 bridging record gap 112. The record gap is therefore shunted by saturable element 150 and no bias flux fringes from gap 112.

The field required to saturate transducing zone 215 of keeper layer 210 is equal to the bias field plus a magnetic field generated by the underlying magnetization of the magnetic layer. Therefore, the generated bias field is preferably selected to be sufficient to selectively saturate the keeper layer over an area solely proximate the reproduce gap. Head 100 directs the bias flux to keeper layer 210 via reproduce gap 114 to locally establish therein adjacent regions of different permeabilities opposite to and bridging that physical gap 114 of head 100.

A magnetic gap is thus formed in an area that functions as transducing zone 215. Upon application of the bias flux, the resulting establishment of adjacent regions of different permeabilities enables signal flux transfers between the head and magnetic layer 204 through the highly permeable areas adjacent zone 215. Since the record gap is shunted by both the keeper layer and the saturable element, the novel two-gap head functions as a conventional single gap head when retrieving signals stored in magnetic layer 204.

Figure 4:
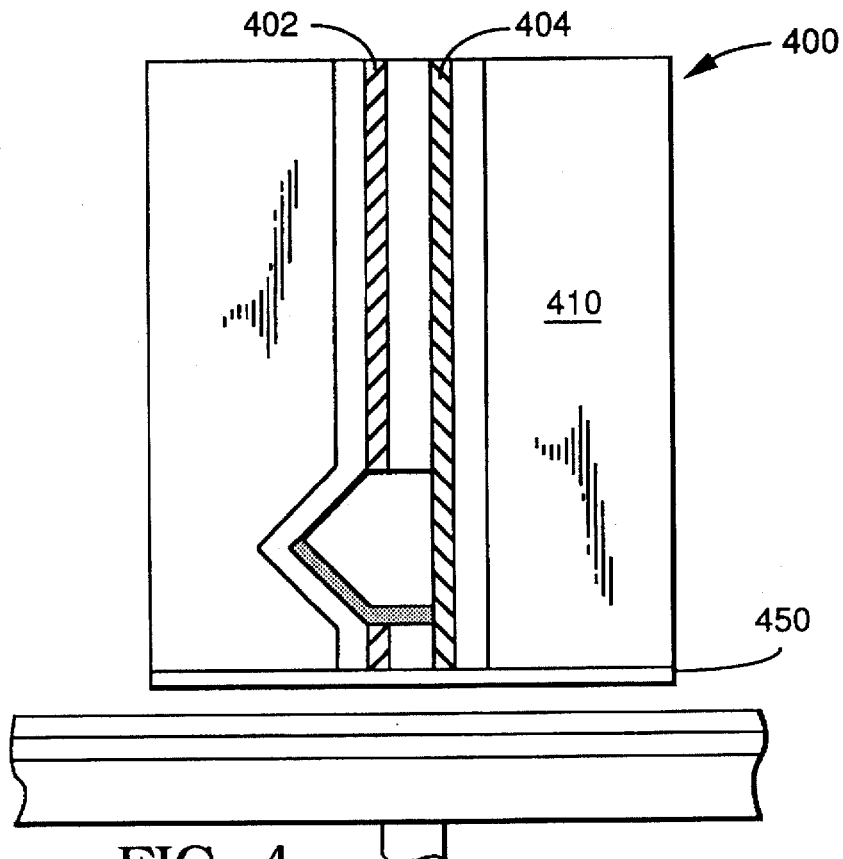
FIG. 4 is a schematized cross-section diagram of an alternate embodiment of the two-gap magnetic read/write head of FIG. 1 wherein the keeper member is deposited on the face of the read/write head.

FIG. 4 is a highly schematized diagram of an alternate embodiment of the two-gap magnetic read/write head 400 wherein keeper member 450 is deposited on the face of the head, i.e., on the surfaces of head poles 402, 404 and core 410. Here, keeper 450 and core 410 are arranged in direct contact and are stationary with respect to each other. Nevertheless, magnetic flux coupling during record and reproduce operations occurs as described previously. This embodiment allows use of the head described herein with conventional disk media.

FIGS. 5(a)–5(f) are perspective drawings depicting stages for constructing the two-gap magnetic read/write head according to the present invention. Referring to these figures and also to FIG. 1, the core 110 of head 100 is preferably formed from a plurality of blocks, each having a dimension of approximately 0.062 ×0.125×0.300 microinches.

Figure 5A:
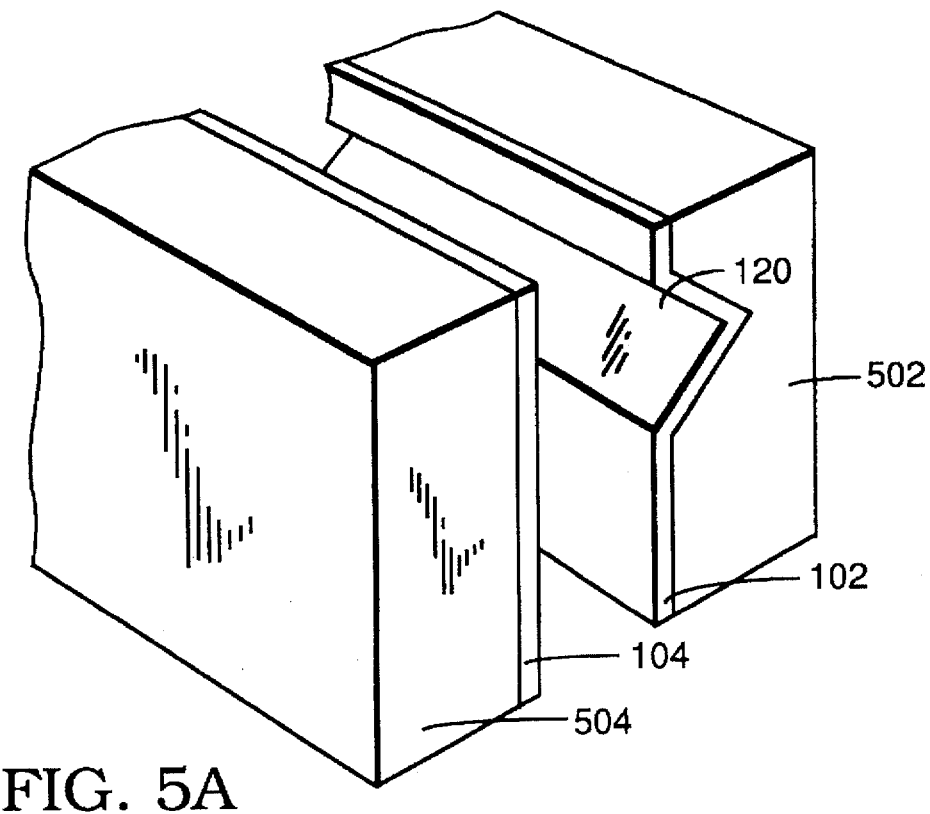
FIGS. 5a–5f are perspective diagrams depicting various stages involved in the construction of the two-gap magnetic read/write head according to the present invention.

FIG. 5(a) is a schematic diagram of two generally elongate core blocks 502 and 504 which, as noted, are preferably made of ferrite material. Initially, winding window 120 is excised from block 502 to form a notched core block 502 and main alfesil poles 102, 104 are then sputtered on both the excised surface of notched core block 502 and on a substantially straight surface of generally linear core block 504. In the illustrative embodiment, each of the main poles may assume a dimension of approximately 25–200 microinches.

Figure 5B:
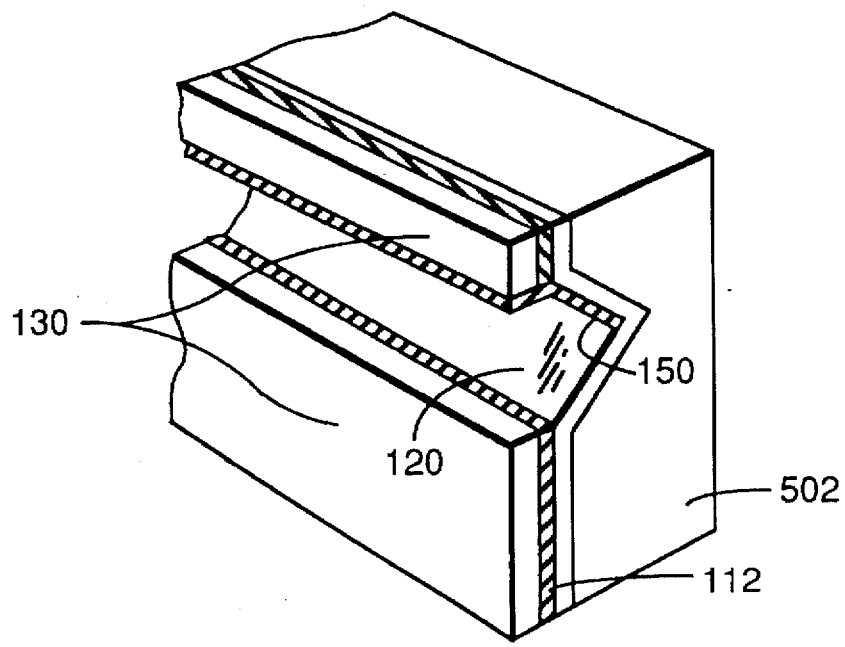

In FIG. 5(b), a record gap spacer 112 consisting of a non-magnetic material, such as glass, silicon dioxide or $Al_2O_3$, is sputtered on core block 502 accomodating winding window 120 prior to sputtering center pole 130 thereon. As noted, this latter pole 130 may be constructed of thin films of metals such as alfesil or permalloy. The width of the center pole may vary within the range of 50–500 microinches; however, in the illustrative embodiment, the center pole preferably has a width of 100 microinches. After depositing the center pole over the surface of record gap spacer 112, saturable element 150 is sputtered over center pole 130 and main pole 102 in a manner that bridges the rear of record gap spacer 112.

Figure 5C:
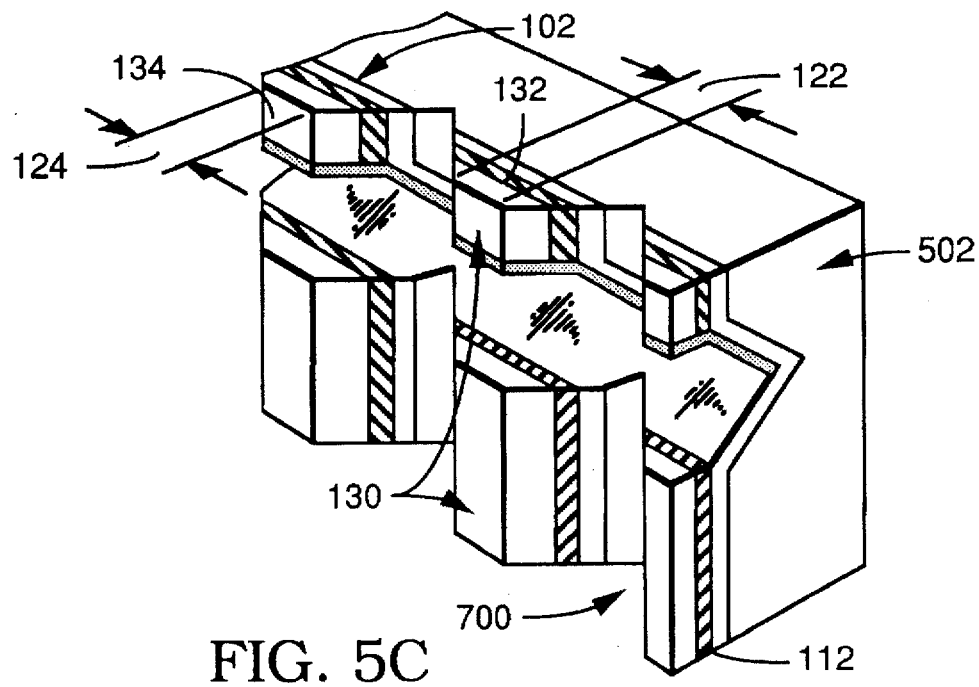

In the next step, shown in FIG. 5(c), a plurality of V-like grooves 700 are cut in core block 502. These grooves extend from center pole 130 to beyond main pole 102 (and through record gap spacer 112) to define the widths of the record and reproduce tracks. As previously noted, the wider side 132 of V-like center pole 130 defines record track width 122, while the narrower, tapered side 134 of the center pole defines reproduce track width 124.

According to the principles of the invention, the structure of the tapered center pole functions to limit the reproduce track width of head 100 within the boundaries established by the greater record track width. As a feature of the present invention, the narrower reproduce gap width separates the gap from interfering signals. In the illustrative embodiment of the invention, the width of the path swept by the reproduce gap, as generated by the novel two-gap head, may range from 50%–90% of the record track width.

Figure 5D:
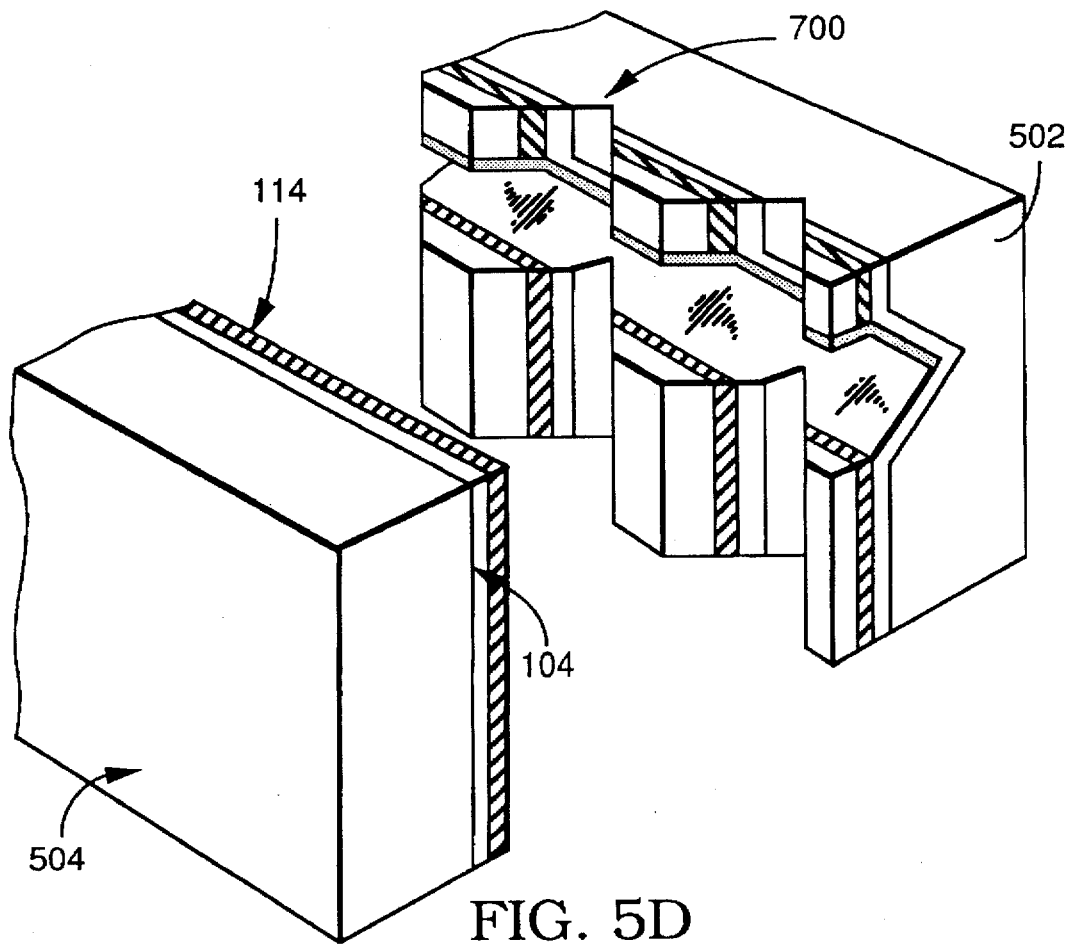
Figure 5E:
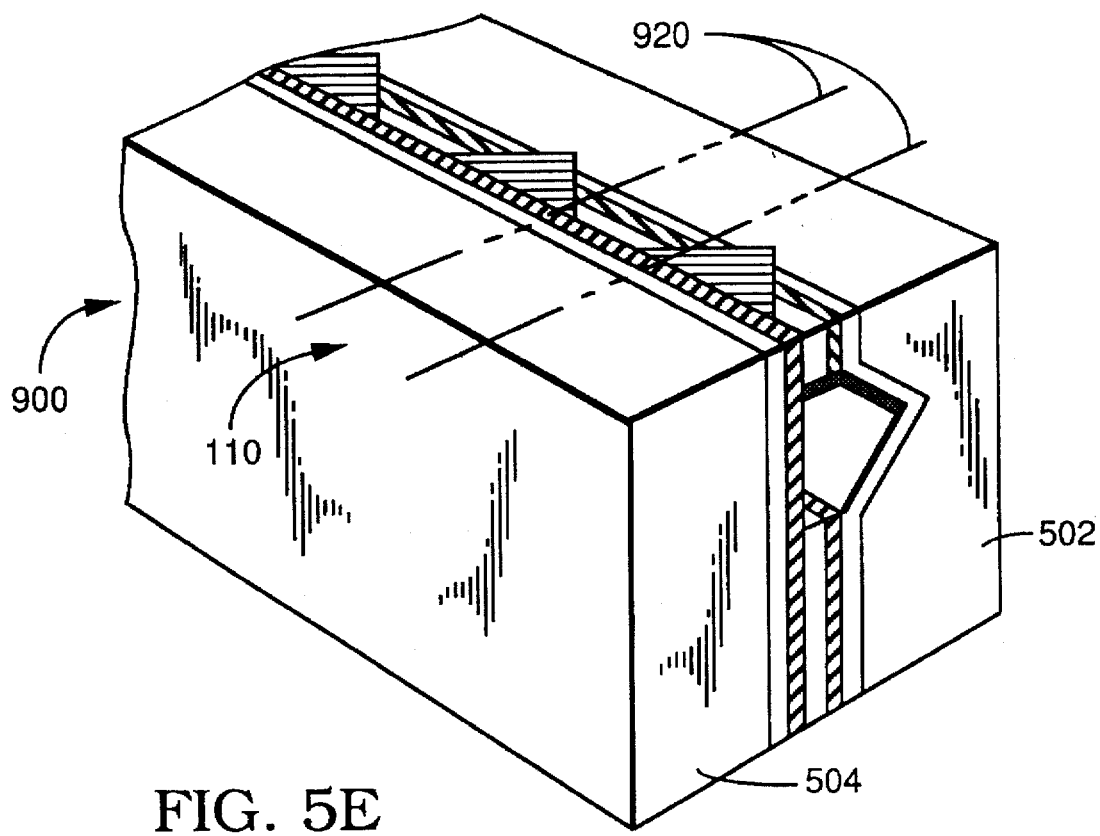
Figure 5F:
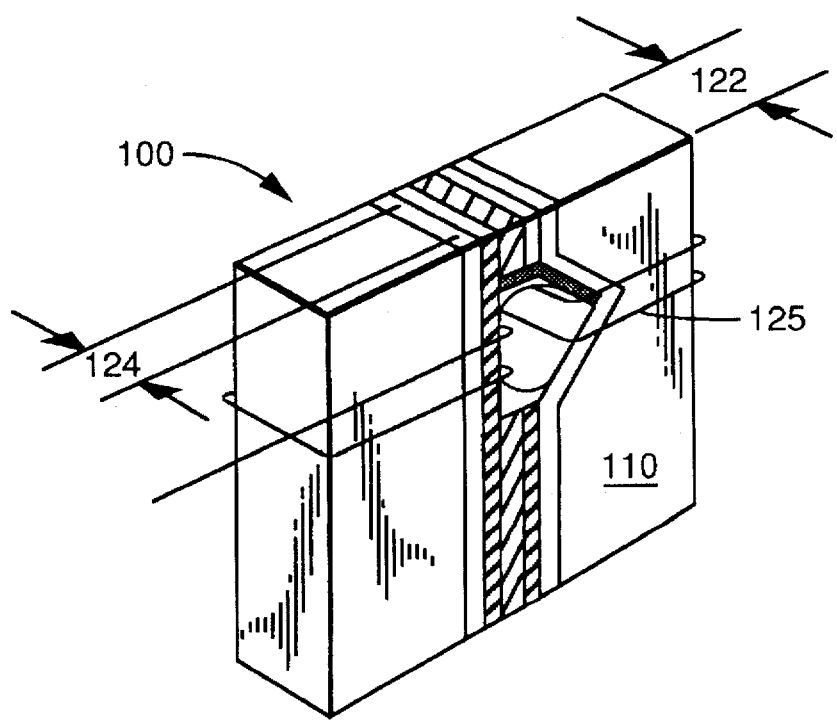

A reproduce gap spacer 114, consisting of material similar to that of the record gap spacer, is sputtered on generally linear core block 504, and over the alfesil pole 104, as depicted in FIG. 5(d). Core blocks 502 and 504 are then bonded together, preferably using conventional glass-bonding techniques, such that the excised surface of notched core block 502 is in facing relation to the substantially straight surface of generally linear core block 504. These bonded core blocks form a head block structure 900 and individual head cores 110 are formed by slicing along lines 920 as shown in FIG. 5(e). In FIG. 5(f), coil winding 125 is coupled to core 110 to thereby produce a completed head core assembly 100 having a reproduce track width 124 that is narrower than record track width 122.

While there have been shown and described several illustrative embodiments for constructing a novel two-gap magnetic read/write head having a reproduce track width that is narrower than a record track width, it is to be understood that various other adaptations and modifications may be made within the spirit and scope of the invention. For example, a method for constructing the two-gap head having a keeper member deposited on the surfaces of the head poles is also contemplated by the present invention. Generally the same construction stages as described above in connection with FIGS. 5(a)–5(f) apply for this embodiment, with the additional step of sputtering a keeper layer directly on the face of the head, shown specifically in FIG. 6.

Figure 6:
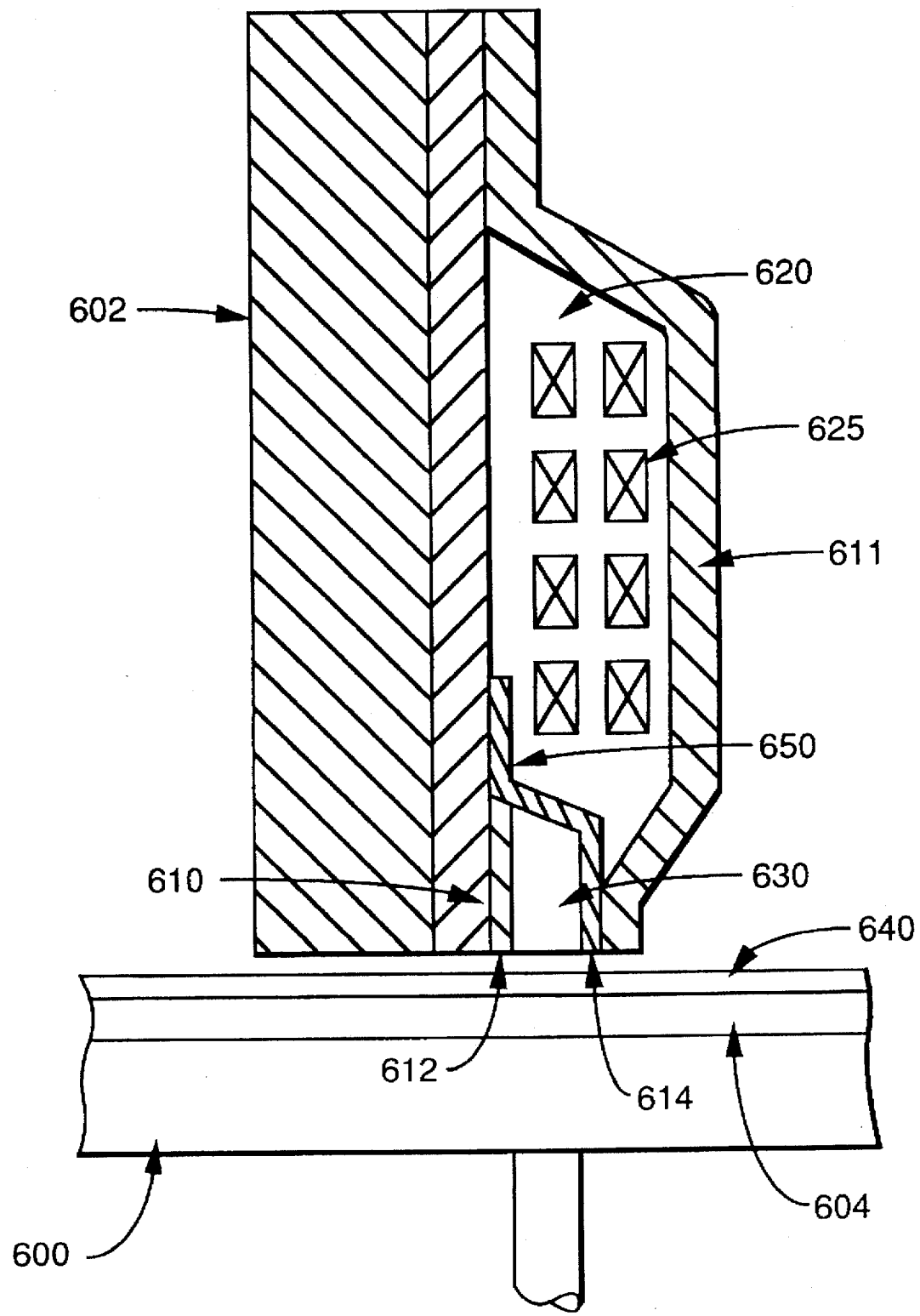
FIG. 6 is schematic diagram of an alternative embodiment of a two gap head using thin film technology.

FIG. 6 is a cross section diagram of an alternate embodiment of the two gap read/write head utilizing thin film technology which is similar to the structure described in FIG. 1. Referring to FIG. 6, the trailing head pole 610 is sputtered on a substrate 602 which may be made from a variety of materials such as Alsilmag, Zirconia, or Calcium Titinate.

The record gap 612 and read gap 614 separate a highly permeable center pole 630 which is positioned between the trailing pole 610 and the leading head pole 611. The trailing and leading poles and center pole are preferably fabricated from a FeAl or NiFe alloy (Alfesil or permalloy). A non-magnetic material such as silicon dioxide or $Al_2O_3$ may be used to define the record and read gaps.

The respective record and read electronics for transferring signals to and from the magnetic storage layer are connected to the head coil 625 which is placed in an aperture 620 formed between the trailing pole 610 and leading pole 611, respectively.

A magnetically saturable high permeability element 650 brideges the rear of the record gap and contacts the center pole 630 and trailing head pole 610.

In this embodiment, conventional thin film head fabrication techniques are used with the exception of the additional sputtering and masking step required to create the center pole anti the saturable element bridging the record gap.

Using the technique shown in FIG. 4, the keeper may also be sputtered on the surface of the head pole to allow it to be used with conventional disk media. The operation of the thin film head embodiment is the same as that of the embodiment previously described.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A magnetic head for writing magnetic signals to and reading magnetic signals from a storage medium within a high-density magnetic storage system comprising:

a high permeability magnetic core structure defining a single magnetic circuit path associated with a single winding and having separate write and read gaps within the core, said core structure further including a high permeability, magnetically saturable element disposed in proximity to a rear portion of the write gap with the thickness and saturation field density of said element being selected so that said element acts as a low reluctance path for mmf existing at the write gap during read mode operation of the head and becomes saturated during write mode of the head whereby mmf at each gap is substantially equal.

2. The magnetic head of claim 1 wherein the magnetic core structure includes a tapered center pole disposed between two generally symmetrical main poles wherein the separate write and read gaps are formed on either side of the center pole.

3. The magnetic head of claim 2 wherein the tapered center pole has a wide side dimension defining the effective width of the write gap and a narrow side dimension defining the effective width of the read gap, wherein the write gap width is wider than the read gap width whereby the head generates a read track on the associated storage medium having a width that is narrower than the write track width generated by said head upon the storage medium.

4. The magnetic head of claim 3 wherein the core structure further includes an aperture for receiving the winding.

* * * * *